US006822363B2

(12) United States Patent
Leijon

(10) Patent No.: US 6,822,363 B2
(45) Date of Patent: Nov. 23, 2004

(54) ELECTROMAGNETIC DEVICE

(75) Inventor: Mats Leijon, Västerås (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 08/952,993

(22) PCT Filed: May 27, 1997

(86) PCT No.: PCT/SE97/00879

§ 371 (c)(1),
(2), (4) Date: Apr. 9, 1998

(87) PCT Pub. No.: WO97/45921

PCT Pub. Date: Dec. 4, 1997

(65) Prior Publication Data

US 2002/0063487 A1 May 30, 2002

(30) Foreign Application Priority Data

May 29, 1996 (SE) ................................. 9602079
Feb. 3, 1997 (SE) ................................. 9700335

(51) Int. Cl.⁷ .............................. H02K 3/40; H02K 3/12
(52) U.S. Cl. ..................... 310/196; 310/179; 310/180; 310/195; 174/DIG. 14; 174/DIG. 20; 174/DIG. 26
(58) Field of Search ................................. 310/179, 180, 310/184, 195–196, 198–208, 213, 254, 258; 290/1 R; 174/DIG. 13–33

(56) References Cited

U.S. PATENT DOCUMENTS

| 681,800 | A | 9/1901 | Lasche |
| 847,008 | A | 3/1907 | Kitsee |
| 1,304,451 | A | 5/1919 | Burnham |
| 1,418,856 | A | 6/1922 | Williamson |
| 1,481,585 | A | 1/1924 | Beard |
| 1,508,456 | A | 9/1924 | Lenz |
| 1,728,915 | A | 9/1929 | Blankenship et al. |
| 1,742,985 | A | 1/1930 | Burnham |
| 1,747,507 | A | 2/1930 | George |
| 1,756,672 | A | 4/1930 | Barr |
| 1,762,775 | A | 6/1930 | Ganz |
| 1,781,308 | A | 11/1930 | Vos |
| 1,861,182 | A | 5/1932 | Hendey et al. |
| 1,904,885 | A | 4/1933 | Seeley |
| 1,974,406 | A | 9/1934 | Apple et al. |
| 2,006,170 | A | 6/1935 | Juhlin |
| 2,206,856 | A | 7/1940 | Shearer |
| 2,217,430 | A | 10/1940 | Baudry |
| 2,241,832 | A | 5/1941 | Wahlquist |

(List continued on next page.)

FOREIGN PATENT DOCUMENTS

| AT | 399790 | 7/1995 |
| BE | 565063 | 2/1957 |
| CH | 391071 | 4/1965 |
| CH | 266037 | 10/1965 |
| CH | 534448 | 2/1973 |

(List continued on next page.)

OTHER PUBLICATIONS

A test installation of a self–tuned ac filter in th Konti–Skan 2 HVDC link; T. Holmgren, G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

(List continued on next page.)

Primary Examiner—Burton Mullins
(74) Attorney, Agent, or Firm—Dykema Gossett PLLC

(57) ABSTRACT

An electromagnetic device comprises a magnetic field generating electrical circuit including a winding (1) having at least one electrical conductor (2). The winding comprises a solid insulation (4) surrounded by outer and inner layers (3, 5) serving for equalization of potential and having semiconducting properties. Said at least one electrical conductor (2) is arranged interiorly of the inner semiconducting layer (3). The invention also relates to methods for electric field control and production of a magnetic circuit as well as use of a cable for obtaining a winding.

37 Claims, 3 Drawing Sheets

U.S. PATENT DOCUMENTS

| | | |
|---|---|---|
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck .................... 310/64 |
| 3,098,893 A | 7/1963 | Pringle et al. |
| 3,130,335 A | 4/1964 | Rejda |
| 3,143,269 A | 8/1964 | Eldik |
| 3,157,806 A | 11/1964 | Wiedermann |
| 3,158,770 A | 11/1964 | Coggeshall et al. ......... 310/214 |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. ............. 310/196 |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch ....................... 310/196 |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey ...................... 106/2 C |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs ......................... 428/212 |
| 3,993,860 A | 11/1976 | Snow et al. |
| 3,995,785 A | 12/1976 | Arick et al. |
| 4,001,616 A | 1/1977 | Lonseth et al. ................ 310/45 |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. ........... 252/511 |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. ............. 36/45 |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A * | 4/1981 | Berner ........................... 290/7 |
| 4,274,027 A | 6/1981 | Higuchi et al. |
| 4,281,264 A | 7/1981 | Keim et al. |
| 4,292,558 A | 9/1981 | Flick et al. |
| 4,307,311 A | 12/1981 | Grozinger |
| 4,308,476 A * | 12/1981 | Schuler ......................... 310/45 |
| 4,308,575 A | 12/1981 | Mase |
| 4,310,966 A | 1/1982 | Brietenbach |
| 4,314,168 A | 2/1982 | Breitenbach |
| 4,317,001 A | 2/1982 | Silver et al. |

| | | | | | | |
|---|---|---|---|---|---|---|
| 4,320,645 A | 3/1982 | Stanley | | 4,723,083 A | 2/1988 | Elton |
| 4,321,426 A | 3/1982 | Schaeffer | | 4,723,104 A | 2/1988 | Rohatyn |
| 4,321,518 A | 3/1982 | Akamatsu | | 4,724,345 A | 2/1988 | Elton et al. |
| 4,330,726 A * | 5/1982 | Albright et al. ............ 310/254 | | 4,737,704 A | 4/1988 | Kalinnikov et al. |
| 4,337,922 A | 7/1982 | Streiff et al. | | 4,745,314 A | 5/1988 | Nakano |
| 4,341,989 A | 7/1982 | Sandberg et al. | | 4,761,602 A | 8/1988 | Leibovich |
| 4,347,449 A | 8/1982 | Beau | | 4,766,365 A | 8/1988 | Bolduc et al. |
| 4,347,454 A | 8/1982 | Gellert et al. | | 4,771,168 A | 9/1988 | Gundersen et al. |
| 4,353,612 A | 10/1982 | Meyers | | 4,785,138 A | 11/1988 | Breitenbach et al. |
| 4,357,542 A | 11/1982 | Kirschbaum | | 4,795,933 A | 1/1989 | Sakai |
| 4,360,748 A | 11/1982 | Raschbichler et al. | | 4,827,172 A | 5/1989 | Kobayashi |
| 4,361,723 A | 11/1982 | Hvizd, Jr. et al. | | 4,845,308 A | 7/1989 | Womack, Jr. et al. |
| 4,365,178 A | 12/1982 | Lexz | | 4,847,747 A | 7/1989 | Abbondanti |
| 4,367,425 A | 1/1983 | Mendelsohn et al. | | 4,853,565 A * | 8/1989 | Elton et al. .................... 310/45 |
| 4,367,890 A | 1/1983 | Spirk | | 4,859,810 A | 8/1989 | Cloetens et al. |
| 4,368,418 A | 1/1983 | Demello et al. | | 4,859,989 A | 8/1989 | McPherson |
| 4,369,389 A | 1/1983 | Lambrecht ................. 310/214 | | 4,860,430 A | 8/1989 | Raschbichler et al. |
| 4,371,745 A | 2/1983 | Sakashita .................... 174/115 | | 4,864,266 A | 9/1989 | Feather et al. |
| 4,384,944 A | 5/1983 | Silver et al. | | 4,883,230 A | 11/1989 | Lindstrom |
| 4,387,316 A | 6/1983 | Katsekas | | 4,890,040 A | 12/1989 | Gundersen |
| 4,401,920 A | 8/1983 | Taylor et al. | | 4,894,284 A | 1/1990 | Yamanouchi et al. |
| 4,403,163 A | 9/1983 | Armerding et al. ......... 310/213 | | 4,914,386 A | 4/1990 | Zocholl |
| 4,404,486 A | 9/1983 | Keim et al. | | 4,918,347 A | 4/1990 | Takaba |
| 4,411,710 A | 10/1983 | Mochizuki et al. | | 4,918,835 A | 4/1990 | Wcislo et al. |
| 4,421,284 A | 12/1983 | Pan | | 4,924,342 A | 5/1990 | Lee |
| 4,425,521 A | 1/1984 | Rosenberry, Jr. et al. | | 4,926,079 A | 5/1990 | Niemela et al. |
| 4,426,771 A | 1/1984 | Wang et al. | | 4,942,326 A | 7/1990 | Butler, III et al. |
| 4,429,244 A * | 1/1984 | Nikitin et al. .............. 310/254 | | 4,949,001 A * | 8/1990 | Campbell .................... 310/220 |
| 4,431,960 A | 2/1984 | Zucker | | 4,982,147 A | 1/1991 | Lauw |
| 4,432,029 A | 2/1984 | Lundqvist | | 4,994,952 A | 2/1991 | Silva et al. |
| 4,437,464 A | 3/1984 | Crow | | 4,997,995 A | 3/1991 | Simmons et al. |
| 4,443,725 A | 4/1984 | Derderian et al. | | 5,012,125 A | 4/1991 | Conway |
| 4,470,884 A | 9/1984 | Carr | | 5,030,813 A | 7/1991 | Stanisz |
| 4,473,765 A | 9/1984 | Butman, Jr. et al. ........ 310/215 | | 5,036,165 A | 7/1991 | Elton et al. ................. 174/102 |
| 4,475,075 A | 10/1984 | Munn | | 5,036,238 A | 7/1991 | Tajima |
| 4,477,690 A | 10/1984 | Nikitin et al. | | 5,066,881 A | 11/1991 | Elton et al. ................. 310/213 |
| 4,481,438 A | 11/1984 | Keim | | 5,067,046 A | 11/1991 | Elton et al. ................. 361/220 |
| 4,484,106 A | 11/1984 | Taylor et al. | | 5,083,360 A | 1/1992 | Valencic et al. |
| 4,488,079 A | 12/1984 | Dailey et al. | | 5,086,246 A | 2/1992 | Dymond et al. |
| 4,490,651 A | 12/1984 | Taylor et al. | | 5,091,609 A | 2/1992 | Sawada et al. |
| 4,503,284 A | 3/1985 | Minnick et al. | | 5,094,703 A | 3/1992 | Takaoka et al. |
| 4,508,251 A | 4/1985 | Harada et al. | | 5,095,175 A | 3/1992 | Yoshida et al. |
| 4,510,077 A | 4/1985 | Elton .......................... 252/502 | | 5,097,241 A | 3/1992 | Smith et al. |
| 4,517,471 A | 5/1985 | Sachs | | 5,097,591 A | 3/1992 | Wcislo et al. |
| 4,520,287 A | 5/1985 | Wang et al. | | 5,111,095 A | 5/1992 | Hendershot |
| 4,523,249 A | 6/1985 | Arimoto | | 5,124,607 A | 6/1992 | Rieber et al. |
| 4,538,131 A | 8/1985 | Baier et al. | | 5,136,459 A | 8/1992 | Fararooy |
| 4,546,210 A | 10/1985 | Akiba et al. | | 5,140,290 A | 8/1992 | Dersch |
| 4,551,780 A | 11/1985 | Canay | | 5,153,460 A | 10/1992 | Bovino et al. |
| 4,557,038 A | 12/1985 | Wcislo et al. | | 5,168,662 A | 12/1992 | Nakamura et al. |
| 4,560,896 A | 12/1985 | Vogt et al. | | 5,171,941 A | 12/1992 | Shimizu et al. |
| 4,565,929 A | 1/1986 | Baskin et al. | | 5,182,537 A | 1/1993 | Thuis |
| 4,571,453 A | 2/1986 | Takaoka et al. | | 5,187,428 A | 2/1993 | Hutchison et al. |
| 4,588,916 A | 5/1986 | Lis | | 5,231,249 A | 7/1993 | Kimura et al. |
| 4,590,416 A | 5/1986 | Porche et al. | | 5,235,488 A | 8/1993 | Koch |
| 4,594,630 A | 6/1986 | Rabinowitz et al. | | 5,246,783 A | 9/1993 | Spenadel et al. |
| 4,607,183 A | 8/1986 | Rieber et al. | | 5,264,778 A | 11/1993 | Kimmel et al. |
| 4,615,109 A | 10/1986 | Wcislo et al. | | 5,287,262 A | 2/1994 | Klein |
| 4,615,778 A | 10/1986 | Elton | | 5,304,883 A | 4/1994 | Denk |
| 4,618,795 A | 10/1986 | Cooper et al. | | 5,305,961 A | 4/1994 | Errard et al. |
| 4,619,040 A | 10/1986 | Wang et al. | | 5,321,308 A | 6/1994 | Johncock |
| 4,622,116 A | 11/1986 | Elton et al. | | 5,323,330 A | 6/1994 | Asplund et al. |
| 4,633,109 A | 12/1986 | Feigel | | 5,325,008 A | 6/1994 | Grant |
| 4,650,924 A | 3/1987 | Kauffman et al. | | 5,325,259 A | 6/1994 | Paulsson |
| 4,652,963 A | 3/1987 | Fahlen | | 5,327,637 A | 7/1994 | Breitenbach et al. |
| 4,654,551 A * | 3/1987 | Farr .......................... 310/112 | | 5,341,281 A | 8/1994 | Skibinski |
| 4,656,316 A | 4/1987 | Meltsch | | 5,343,139 A | 8/1994 | Gyugyi et al. |
| 4,656,379 A * | 4/1987 | McCarty .................... 310/181 | | 5,355,046 A | 10/1994 | Weigelt |
| 4,677,328 A | 6/1987 | Kumakura | | 5,365,132 A | 11/1994 | Hann et al. |
| 4,687,882 A | 8/1987 | Stone et al. | | 5,387,890 A | 2/1995 | Estop et al. |
| 4,692,731 A | 9/1987 | Osinga | | 5,397,513 A | 3/1995 | Steketee, Jr. |

| | | | | | | |
|---|---|---|---|---|---|---|
| 5,399,941 | A | 3/1995 | Grothaus et al. | DE | 138840 | 11/1979 |
| 5,400,005 | A | 3/1995 | Bobry | DE | 2824951 | 12/1979 |
| 5,408,169 | A | 4/1995 | Jeanneret | DE | 2835386 | 2/1980 |
| 5,449,861 | A | 9/1995 | Fujino et al. | DE | 2839517 | 3/1980 |
| 5,452,170 | A | 9/1995 | Ohde et al. | DE | 2854520 | 6/1980 |
| 5,468,916 | A | 11/1995 | Litenas et al. | DE | 3009102 | 9/1980 |
| 5,499,178 | A | 3/1996 | Mohan | DE | 2913697 | 10/1980 |
| 5,500,632 | A | 3/1996 | Halser, III | DE | 2920478 | 12/1980 |
| 5,510,942 | A | 4/1996 | Bock et al. | DE | 3028777 | 3/1981 |
| 5,530,307 | A | 6/1996 | Horst | DE | 2939004 | 4/1981 |
| 5,533,658 | A | 7/1996 | Benedict et al. | DE | 3006382 | 8/1981 |
| 5,534,754 | A | 7/1996 | Poumey | DE | 3008818 | 9/1981 |
| 5,545,853 | A | 8/1996 | Hildreth | DE | 209313 | 4/1984 |
| 5,550,410 | A * | 8/1996 | Titus ............................ 290/52 | DE | 3305225 | 8/1984 |
| 5,583,387 | A | 12/1996 | Takeuchi et al. | DE | 3309051 | 9/1984 |
| 5,587,126 | A | 12/1996 | Steketee, Jr. | DE | 3441311 | 5/1986 |
| 5,598,137 | A | 1/1997 | Alber et al. | DE | 3543106 | 6/1987 |
| 5,607,320 | A | 3/1997 | Wright | DE | 2917717 | 8/1987 |
| 5,612,510 | A | 3/1997 | Hildreth | DE | 3612112 | 10/1987 |
| 5,663,605 | A * | 9/1997 | Evans et al. ................. 310/181 | DE | 3726346 | 2/1989 |
| 5,672,926 | A * | 9/1997 | Brandes et al. ............. 310/181 | DE | 3925337 | 2/1991 |
| 5,689,223 | A | 11/1997 | Demarmels et al. | DE | 4023903 | 11/1991 |
| 5,807,447 | A | 9/1998 | Forrest | DE | 4022476 | 1/1992 |
| 5,834,699 | A | 11/1998 | Buck et al. | DE | 4233558 | 3/1994 |

FOREIGN PATENT DOCUMENTS

| | | | | | |
|---|---|---|---|---|---|
| | | | DE | 4402184 | 8/1995 |
| | | | DE | 4409794 | 8/1995 |
| CH | 539328 | 7/1973 | DE | 4412761 | 10/1995 |
| CH | 646403 | 2/1979 | DE | 4420322 | 12/1995 |
| CH | 657482 | 8/1986 | DE | 19620906 | 1/1996 |
| CH | 1189322 | 10/1986 | DE | 4438186 | 5/1996 |
| DE | 40414 | 8/1887 | DE | 19020222 | 3/1997 |
| DE | 277012 | 7/1914 | DE | 19547229 | 6/1997 |
| DE | 336418 | 6/1920 | DE | 468827 | 7/1997 |
| DE | 372390 | 3/1923 | DE | 134022 | 12/2001 |
| DE | 386561 | 12/1923 | EP | 049104 | 4/1982 |
| DE | 387973 | 1/1924 | EP | 0493704 | 4/1982 |
| DE | 406371 | 11/1924 | EP | 0056580 A1 | 7/1982 |
| DE | 425551 | 2/1926 | EP | 078908 | 5/1983 |
| DE | 426793 | 3/1926 | EP | 0120154 | 10/1984 |
| DE | 432169 | 7/1926 | EP | 0130124 | 1/1985 |
| DE | 433749 | 9/1926 | EP | 0142813 | 5/1985 |
| DE | 435608 | 10/1926 | EP | 0155405 | 9/1985 |
| DE | 435609 | 10/1926 | EP | 0102513 | 1/1986 |
| DE | 441717 | 3/1927 | EP | 0174783 | 3/1986 |
| DE | 443011 | 4/1927 | EP | 0185788 | 7/1986 |
| DE | 460124 | 5/1928 | EP | 0277358 | 8/1986 |
| DE | 482506 | 9/1929 | EP | 0234521 | 9/1987 |
| DE | 501181 | 7/1930 | EP | 0244069 | 11/1987 |
| DE | 523047 | 4/1931 | EP | 0246377 | 11/1987 |
| DE | 568508 | 1/1933 | EP | 0265868 | 5/1988 |
| DE | 572030 | 3/1933 | EP | 0274691 | 7/1988 |
| DE | 584639 | 9/1933 | EP | 0280759 | 9/1988 |
| DE | 586121 | 10/1933 | EP | 0282876 | 9/1988 |
| DE | 604972 | 11/1934 | EP | 0309096 | 3/1989 |
| DE | 629301 | 4/1936 | EP | 0314860 | 5/1989 |
| DE | 468827 * | 2/1937 ................ 310/254 | EP | 0316911 | 5/1989 |
| DE | 673545 | 3/1939 | EP | 0317248 | 5/1989 |
| DE | 719009 | 3/1942 | EP | 0335430 | 10/1989 |
| DE | 846583 | 8/1952 | EP | 0342554 | 11/1989 |
| DE | 875227 | 4/1953 | EP | 0221404 | 5/1990 |
| DE | 975999 | 1/1963 | EP | 0375101 | 6/1990 |
| DE | 1465719 | 5/1969 | EP | 0406437 | 1/1991 |
| DE | 1807391 | 5/1970 | EP | 0439410 | 7/1991 |
| DE | 2050674 | 5/1971 | EP | 0440865 | 8/1991 |
| DE | 1638176 | 6/1971 | EP | 0469155 A1 | 2/1992 |
| DE | 2155371 | 5/1973 | EP | 0490705 | 6/1992 |
| DE | 2400698 | 7/1975 | EP | 0503817 | 9/1992 |
| DE | 2520511 | 11/1976 | EP | 0571155 | 11/1993 |
| DE | 2656389 | 6/1978 | EP | 0620570 | 10/1994 |
| DE | 2721905 | 11/1978 | EP | 0620630 | 10/1994 |
| DE | 137164 | 8/1979 | EP | 0642027 | 3/1995 |

| | | | | | |
|---|---|---|---|---|---|
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965741 | 8/1964 | JP | 7264789 | 3/1994 |
| GB | 992249 | 5/1965 | JP | 8167332 | 12/1994 |
| GB | 1024583 | 3/1966 | JP | 7161270 | 6/1995 |
| GB | 1053337 | 12/1966 | JP | 8264039 | 11/1995 |
| GB | 1059123 | 2/1967 | JP | 9200989 | 1/1996 |
| GB | 1103098 | 2/1968 | JP | 8036952 | 2/1996 |
| GB | 1103099 | 2/1968 | JP | 8167360 | 6/1996 |
| GB | 1117401 | 6/1968 | LU | 67199 | 3/1972 |
| GB | 1135242 | 12/1968 | SE | 90308 | 9/1937 |
| GB | 1147049 | 4/1969 | SE | 305899 | 11/1968 |
| GB | 1157885 | 7/1969 | SE | 255156 | 2/1969 |
| GB | 1174659 | 12/1969 | SE | 341428 | 12/1971 |
| GB | 1236082 | 6/1971 | SE | 453236 | 1/1982 |
| GB | 1268770 | 3/1972 | SE | 457792 | 6/1987 |
| GB | 1319257 | 6/1973 | SE | 502417 | 12/1993 |
| GB | 1322433 | 7/1973 | SU | 792302 | 1/1971 |
| GB | 1340983 | 12/1973 | SU | 425268 | 9/1974 |

| | | | | | | |
|---|---|---|---|---|---|---|
| SU | 1019553 | 1/1980 | | WO | PCT/FR 98/00468 | 6/1998 |
| SU | 694939 | 1/1982 | | WO | WO9827634 | 6/1998 |
| SU | 955369 | 8/1983 | | WO | WO9827635 | 6/1998 |
| SU | 1511810 | 5/1987 | | WO | WO9827636 | 6/1998 |
| WO | WO8202617 | 8/1982 | | WO | WO9829927 | 7/1998 |
| WO | WO8502302 | 5/1985 | | WO | WO9829928 | 7/1998 |
| WO | WO9011389 | 10/1990 | | WO | WO9829929 | 7/1998 |
| WO | WO9012409 | 10/1990 | | WO | WO9829930 | 7/1998 |
| WO | PCT/DE 90/00279 | 11/1990 | | WO | WO9829931 | 7/1998 |
| WO | WO9101059 | 1/1991 | | WO | WO9829932 | 7/1998 |
| WO | WO9101585 | 2/1991 | | WO | WO9833731 | 8/1998 |
| WO | WO9107807 | 3/1991 | | WO | WO9833736 | 8/1998 |
| WO | PCT SE 91/00077 | 4/1991 | | WO | WO9833737 | 8/1998 |
| WO | WO9109442 | 6/1991 | | WO | WO9834238 | 8/1998 |
| WO | WO 91/11841 | 8/1991 | | WO | WO 98/34239 | 8/1998 |
| WO | WO8115862 | 10/1991 | | WO | WO9834240 | 8/1998 |
| WO | WO 91/15755 | 10/1991 | | WO | WO9834241 | 8/1998 |
| WO | WO9201328 | 1/1992 | | WO | WO9834242 | 8/1998 |
| WO | WO9203870 | 3/1992 | | WO | WO9834243 | 8/1998 |
| WO | WO9321681 | 10/1993 | | WO | WO9834244 | 8/1998 |
| WO | WO9406194 | 3/1994 | | WO | WO9834245 | 8/1998 |
| WO | WO9518058 | 7/1995 | | WO | WO9834246 | 8/1998 |
| WO | WO9522153 | 8/1995 | | WO | WO9834247 | 8/1998 |
| WO | WO9524049 | 9/1995 | | WO | WO9834248 | 8/1998 |
| WO | WO9622606 | 7/1996 | | WO | WO9834249 | 8/1998 |
| WO | WO9622607 | 7/1996 | | WO | WO9834250 | 8/1998 |
| WO | PCT/CN 96/00010 | 10/1996 | | WO | WO9834309 | 8/1998 |
| WO | WO9630144 | 10/1996 | | WO | WO9834312 | 8/1998 |
| WO | WO9710640 | 3/1997 | | WO | WO9834315 | 8/1998 |
| WO | WO9711831 | 4/1997 | | WO | WO9834321 | 8/1998 |
| WO | WO9716881 | 5/1997 | | WO | WO9834322 | 8/1998 |
| WO | WO 97/29494 | 8/1997 | | WO | WO9834323 | 8/1998 |
| WO | WO9745288 | 12/1997 | | WO | WO9834325 | 8/1998 |
| WO | WO9745847 | 12/1997 | | WO | WO9834326 | 8/1998 |
| WO | WO9745848 | 12/1997 | | WO | WO9834327 | 8/1998 |
| WO | WO9745906 | 12/1997 | | WO | WO9834328 | 8/1998 |
| WO | WO9745907 | 12/1997 | | WO | WO9834329 | 8/1998 |
| WO | WO9745912 | 12/1997 | | WO | WO9834330 | 8/1998 |
| WO | WO9745914 | 12/1997 | | WO | WO9834331 | 8/1998 |
| WO | WO9745915 | 12/1997 | | WO | WO 98/40627 | 9/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |
| WO | WO9745930 | 12/1997 | | WO | WO9917428 | 4/1999 |
| WO | WO9745931 | 12/1997 | | WO | WO9917429 | 4/1999 |
| WO | WO9745932 | 12/1997 | | WO | WO9917432 | 4/1999 |
| WO | WO9745933 | 12/1997 | | WO | WO9917433 | 4/1999 |
| WO | WO9745934 | 12/1997 | | WO | WO9919963 | 4/1999 |
| WO | WO9745935 | 12/1997 | | WO | WO9919969 | 4/1999 |
| WO | WO9745936 | 12/1997 | | WO | WO9919970 | 4/1999 |
| WO | WO9745937 | 12/1997 | | WO | PCT/SE 98/02148 | 6/1999 |
| WO | WO9745938 | 12/1997 | | WO | WO9927546 | 6/1999 |
| WO | WO9745939 | 12/1997 | | WO | WO9928919 | 6/1999 |
| WO | WO9747067 | 12/1997 | | WO | WO9928921 | 6/1999 |
| WO | WO9820595 | 5/1998 | | WO | WO 99/28922 | 6/1999 |
| WO | WO9820596 | 5/1998 | | WO | WO9928923 | 6/1999 |
| WO | WO9820597 | 5/1998 | | WO | WO9928924 | 6/1999 |
| WO | WO 98/20598 | 5/1998 | | WO | WO9928925 | 6/1999 |
| WO | WO9820600 | 5/1998 | | WO | WO9928926 | 6/1999 |
| WO | WO 98/20602 | 5/1998 | | WO | WO9928927 | 6/1999 |
| WO | WO9821385 | 5/1998 | | WO | WO9928928 | 6/1999 |

| | | |
|---|---|---|
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO 99/29005 | 6/1999 |
| WO | WO9929005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika*, 1970, pp. 6–8.

J&P Transformer Book 11$^{th}$ Edition;A.C. Franklin et al; owned by Butterworth–Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drivers; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp 16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc. vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/NewYork; 1975, pp 327–328.

Elektriska Maskiner; F. Gustavson; Institute for Elkreafteknilk, KTH; Stockholm, 1996, pp 3–6–3–12.

Die Wechselstromtechnik; A. Cour' Springer Verlag, Germany; 1936, pp 586–598.

Insulation systems for superconducting transmission cables; O. Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorblorg; ISBN 0–86238–341–2, 1993, pp 1–13.

Regulating transformers in power systems– new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering, second edition 1995 ISBN 0–07–462286–2, Chapter 5, pp91–98.

Perfomance Characteristics of a Wide Range Induction Type Frequency Converter; G.A. Ghoneem; Ieema Journal; Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2, pp 322–329.

Power El ctronics and Variabl Frequency Drives; B. Bimal; IEEE industrial Electronics—Technology and Applications, 1996, pp. 356.

Properties of High Plymer Cemet Mortar; M. Tamai et al; *Science & Technology in Japan, No 63*; 1977, pp 6–14.

Weatherability of Polymer–Modified M rtars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

Shipboard Electrical Insulation; G. L. Moses, 1951, pp2&3.

ABB Elkrafthandbok; ABB AB; pp274–276.

Elkraft teknisk Handbok, 2 Elmaskiner; A. Alfredsson et al; 1988, pp 121–123.

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Elne neue Type von Unterwassermotoren; Electrotechnik und Maschinenbam, 49; Aug. 1931; pp2–3.

Problems in design of the 110–5OokV high–voltage generators; Kikiti et al; World Electrotechnical Congress; 6/21–27/77; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen– ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1977 pp11–16.

Der Asynchronmotor als Antrieb stopfbcichsloser Pumpen; E. Picmaus; Eletrotechnik und Maschinenbay No. 78, pp153–155, 1961.

Low core loss rotating flux transformer; R. F. Krause, et al; American Institute Physics J.Appl.Phys vol.64 #10 Nov. 1988, pp5376–5378.

An EHV bulk Power transmission line Made with Low Loss XLPE Cable;Ichihara et al; 8/92; pp3–6.

Underground Transmission Systems Reference Book; 1992;pp16–19; pp36–45; pp67–81.

Power System Stability and Control; P. Kundur, 1994; pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators– an assessment; A. Appleton, et al; International Conf. Proceedings Lg HV Elec. Sys. Paris, FR, Aug.–Sep./ 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire;T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

P. Marti and R. Schuler, "Manufacturing and Testing Roebel Bars".

M. Ichihara and F. Fukasawa, "An EHV Bulk Power Transmission Line Made with Low Loss XLPE Cable," Aug. 1992, *Hita Cable Review*, No. 11, pp. 3–6.

*Underground Transmission Systems Reference Book*, 1992 Edition, prepared by Power Technologies, Inc. for Electric Po Research Institute (title page).

P. Kundur, "Power System Stability and Control," *Electric Power Research Institute Power System Engineering Series*, McGraw–Hill, Inc.

R. F. Schiferl and C. M. Ong, "Six Phase Synchronous Machine with AC and DC Stator Connections, Part II: Harmonic St and a Proposed Uninterruptible Power Supply Scheme", *IEEE Transactions on Power Apparatus and Systems*, V I. PAS No. 8, Aug. 1983, pp. 2694–2701.

R. F. Schiferl and C. M. Ong, "Six Phase Synchronous Machine with AC and DC Stator Connections, Part I: Equivalent Ci. Representation and Steady–State Analysis", *IEEE Transactions on Power Apparatus and Systems*, vol. PAS–102, No. 8, 1983, pp. 2685–2693.

T. Petersson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines,*Handbook of Electric Machines*, Chapter 9, McGraw Hill, 1987, pp. 9–1–9–25.

\* cited by examiner

ELECTROMAGNETIC DEVICE

TECHNICAL FIELD

This invention is related to an electromagnetic device for electric power purposes, comprising a magnetic field generating electric circuit including at least one electric conductor having an insulation system. This electromagnetic device may be used in any electrotechnical connection. The power range may be from VA up to the 1000-MVA range. High voltage applications are primarily intended, up to the highest transmission voltages used today.

According to a first aspect of the invention a rotating electric machine is contemplated. Such electric machines comprise synchronous machines which are mainly used as generators for connection to distribution and transmission networks, commonly referred to below as power networks. The synchronous machines are also used as motors and for phase compensation and voltage control, in that case as mechanically idling machines. The technical field also comprises double-fed machines, asynchronous converter cascades, external pole machines, synchronous flux machines and asynchronous machines.

According to another aspect of the invention, said electromagnetic device is formed by a power transformer or reactor. For all transmission and distribution of electric energy, transformers are used and their task is to allow exchange of electric energy between two or more electric systems and for this, electromagnetic induction is utilized in a well-known manner. The transformers primarily intended with the present invention belong to the so-called power transformers with a rated power of from a few hundred kVA up to more than 1000 MVA with a rated voltage of from 3–4 kV and up to very high transmission voltages, 400 kV to 800 kV or higher.

Although the following description of the prior art with respect to the second aspect mainly refers to power transformers, the present invention is also applicable to reactors, which, as is well-known, may be designed as single-phase and three-phase reactors. As regards insulation and cooling there are, in principle, the same embodiments as for transformers. Thus, air-insulated and oil-insulated, self-cooled, pressure-oil cooled, etc., reactors are available. Although reactors have one winding (per phase) and may be designed both with and without a magnetic core, the description of the background art is to a large extent relevant also to reactors.

The magnetic field inducing electric circuit may in some embodiments be air-wound but comprises as a rule a magnetic core of laminated, normal or oriented, sheet or other, for example amorphous or powder-based, material, or any other action for the purpose of allowing an alternating flux, and a winding. The circuit often comprises some kind of cooling system etc. In the case of a rotating electric machine, the winding may be disposed in the stator or the rotor of the machine, or in both.

The invention also comprises a method for electric field control in an electromagnetic device and a method for production of a magnetic circuit.

PRIOR ART

In order to be able to explain and describe the invention, the prior art will be discussed hereinafter both in respect of a rotating electric machine and a power transformer.
Rotating Electric Machine Such a rotating electric machine will be exemplified based upon a synchronous machine. The first part of the description substantially relates to the magnetic circuit of such a machine and how it is composed according to classic technique. Since the magnetic circuit referred to in most cases is disposed in the stator, the magnetic circuit below will normally be described as a stator with a laminated core, the winding of which will be referred to as a stator winding, and the slots in the laminated core for the winding will be referred to as stator slots or simply slots.

Most synchronous machines have a field winding in the rotor, where the main flux is generated by direct current, and an ac winding in the stator. The synchronous machines are normally of three-phase design. Sometimes, the synchronous machines are designed with salient poles. The latter have an ac winding in the rotor.

The stator body for large synchronous machines are often made of sheet steel with a welded construction. The laminated core is normally, made from varnished 0.35 or 0.5 mm electric sheet. For larger machines, the sheet is punched into segments which are attached to the stator body by means of wedges/dovetails. The laminated core is retained by pressure fingers and pressure plates.

For cooling of the windings of the synchronous machine, three different cooling systems are available.

In case of air cooling, both the stator winding and the rotor winding are cooled by cooling air flowing through. The cooling air channels are to be found both in the stator laminations and in the rotor. For radial ventilation and cooling by means of air, the sheet iron core at least for medium-sized and large machines is divided into stacks with radial and axial ventilation ducts disposed in the core. The cooling air may consist of ambient air but at high power a closed cooling system with heat exchangers is substantially used. Hydrogen cooling is used in turbogenerators and in large synchronous compensators. The cooling method functions in the same way as in air cooling with heat exchangers, but instead of air as coolant there is used hydrogen gas. The hydrogen gas has better cooling capacity than air, but difficulties arise at seals and in monitoring leakage. For turbogenerators in the higher power range it is known to apply water cooling of both the stator winding and the rotor winding. The cooling channels are in the form of tubes which are placed inside conductors in the stator winding. One problem with large machines is that the cooling tends to become non-uniform and that, therefore, temperature differences arise across the machine.

The stator winding is disposed in slots in the sheet iron core, the slots normally having a cross section as that of a rectangle or a trapezoid. Each winding phase comprises a number of series-connected coil groups and each coil group comprises a number of series-connected coils. The different parts of the coil are designated coil side for that part which is placed in the stator and coil end for that part which is disposed outside the stator. A coil comprises one or more conductors brought together in height and/or width. Between each conductor there is a thin insulation, for example epoxy/glass fibre.

The coil is insulated against the slot with a coil insulation, that is, an insulation intended to withstand the rated voltage of the machine to ground. As insulating material, various plastic, varnish and glass fibre materials may be used. Usually, so-called mica tape is used, which is a mixture of mica and hard plastic, especially produced to provide resistance to partial discharges, which can rapidly break down the insulation. The insulation is applied to the coil by winding the mica tape around the coil in several layers. The insulation is impregnated, and then the coil side is painted with a coal-based paint to improve the contact with the surrounding stator which is connected to ground potential.

The conductor area of the windings is determined by the current intensity in question and by the cooling method used. The conductor and the coil are usually formed with a rectangular shape to maximize the amount of conductor material in the slot. A typical coil is formed of so-called Roebel bars, in which certain of the bars may be made hollow for a coolant. A Roebel bar comprises a plurality of rectangular, parallel-connected copper conductors, which are transposed 360 degrees along the slot. Ringland bars with transpositions of 540 degrees and other transpositions also occur. The transposition is made to avoid the occurrence of circulating currents which are generated in a cross section of the conductor material, as viewed from the magnetic field.

For mechanical and electrical reasons, a machine cannot be made in just any size. The machine power is determined substantially by three factors:

The conductor area of the windings. At normal operating temperature, copper, for example, has a maximum value of 3–3.5 A/mm$^2$.

The maximum flux density (magnetic flux) in the stator and rotor material.

The maximum electric field strength in the insulating material, the so-called dielectric strength.

Polyphase ac windings are designed either as single-layer or two-layer windings. In the case of single-layer windings, there is only one coil side per slot, and in the case of two-layer windings there are two coil sides per slot. Two-layer windings are usually designed as diamond windings, whereas the single-layer windings which are relevant in this connection may be designed as a diamond winding or as a concentric winding. In the case of a diamond winding, only one coil span (or possibly two coil spans) occurs, whereas flat windings are designed as concentric windings, that is, with a greatly varying coil width. By coil width is meant the distance in circular measure between two coil sides belonging to the same coil, either in relation to the relevant pole pitch or in the number of intermediate slot pitches. Usually, different variants of chording are used, for example fractional pitch, to give the winding the desired properties. The type of winding substantially describes how the coils in the slots, that is, the coil sides, are connected together outside the stator, that is, at the coil ends.

Outside the stacked sheets of the stator, the coil is not provided with a painted semiconducting ground-potential layer. The coil end is normally provided with an E-field control in the form of so-called corona protection varnish intended to convert a radial field into an axial field, which means that the insulation on the coil ends occurs at a high potential relative to ground. This sometimes gives rise to corona in the coil-end region, which may be destructive. The so-called field-controlling points at the coil ends entail problems for a rotating electric machine.

Normally, all large machines are designed with a two-layer winding and equally large coils. Each coil is placed with one side in one of the layers and the other side in the other layer. This means that all the coils cross each other in the coil end. If more than two layers are used, these crossings render the winding work difficult and deteriorate the coil end.

It is generally known that the connection of a synchronous machine/generator to a power network must be made via a Δ/Y-connected so-called step-up transformer, since the voltage of the power network normally lies at a higher level than the voltage of the rotating electric machine. Together with the synchronous machine, this transformer thus constitutes integrated parts of a plant. The transformer constitutes an extra cost and also entails the disadvantage that the total efficiency of the system is lowered. If it were possible to manufacture machines for considerably higher voltages, the step-up transformer could thus be omitted.

During the last few decades, there have been increasing requirements for rotating electric machines for higher voltages than what has previously been possible to design. The maximum voltage level which, according to the state of the art, has been possible to achieve for synchronous machines with a good yield in the coil production is around 25–30 kV.

Certain attempts to a new approach as regards the design of synchronous machines are described, inter alia, in an article entitled "Water-and-oil-cooled Turbogenerator TVM-300" in J. Elektrotechnika, No. 1, 1970, pp. 6–8, in U.S. Pat. No. 4,429,244 "Stator of Generator" and in Russian patent document CCCP Patent 955369.

The water- and oil-cooled synchronous machine described in J. Elektrotechnika is intended for voltages up to 20 kV. The article describes a new insulation system consisting of oil/paper insulation, which makes it possible to immerse the stator completely in oil. The oil can then be used as a coolant while at the same time using it as insulation. To prevent oil in the stator from leaking out towards the rotor, a dielectric oil-separating ring is provided at the internal surface of the core. The stator winding is made from conductors with an oval hollow shape provided with oil and paper insulation. The coil sides with their insulation are secured to the slots made with rectangular cross section by means of wedges. As coolant oil is used both in the hollow conductors and in holes in the stator walls. Such cooling systems, however, entail a large number of connections of both oil and electricity at the coil ends. The thick insulation also entails an increased radius of curvature of the conductors, which in turn results in an increased size of the winding overhang.

The above-mentioned U.S. patent relates to the stator part of a synchronous machine which comprises a magnetic core of laminated sheet with trapezoidal slots for the stator winding. The slots are tapered since the need of insulation of the stator winding is smaller towards the interior of the rotor where that part of the winding which is located nearest the neutral point is disposed. In addition, the stator part comprises a dielectric oil-separating cylinder nearest the inner surface of the core. This part may increase the magnetization requirement relative to a machine without this ring. The stator winding is made of oil-immersed cables with the same diameter for each coil layer. The layers are separated from each other by means of spacers in the slots and secured by wedges. What is special for the winding is that it comprises two so-called half-windings connected in series. One of the two half-windings is disposed, centred, inside an insulating sleeve. The conductors of the stator winding are cooled by surrounding oil. Disadvantages with such a large quantity of oil in the system are the risk of leakage and the considerable amount of cleaning work which may result from a fault condition. Those parts of the insulating sleeve which are located outside the slots have a cylindrical part and a conical termination reinforced with current-carrying layers, the duty of which is to control the electric field strength in the region where the cable enters the end winding.

From CCCP 955369 it is clear, in another attempt to raise the rated voltage of the synchronous machine, that the oil-cooled stator winding comprises a conventional high-voltage cable with the same dimension for all the layers. The cable is placed in stator slots formed as circular, radially disposed openings corresponding to the cross-section area of the cable and the necessary space for fixing and for coolant. The different radially disposed layers of the winding are surrounded by and fixed in insulating tubes. Insulating spacers fix the tubes in the stator slot. Because of the oil cooling, an internal dielectric ring is also needed here for sealing the oil coolant against the internal air gap. The design also exhibits a very narrow radial waist between the different stator slots, which means a large slot leakage flux which significantly influences the magnetization requirement of the machine.

A report from Electric Power Research Institute, EPRI, EL-3391, from 1984 describes a review of machine concepts for achieving a higher voltage of a rotating electric machine for the purpose of being able to connect a machine to a power network without an intermediate transformer. Such a solution is judged by the investigation to provide good efficiency gains and great economic advantages. The main reason that it was considered possible in 1984 to start developing generators for direct connection to power networks was that at that time a superconducting rotor had been produced. The large magnetization capacity of the superconducting field makes it possible to use an air gap winding with a sufficient thickness to withstand the electrical stresses. By combining the most promising concept, according to the project, of designing a magnetic circuit with a winding, a so-called monolith cylinder armature, a concept where the winding comprises two cylinders of conductors concentrically enclosed in three cylindrical insulating casings and the whole structure is fixed to an iron core without teeth, it was judged that a rotating electric machine for high voltage could be directly connected to a power network. The solution meant that the main insulation had to be made sufficiently thick to cope with network-to-network and network-to-ground potentials. The insulation system which, after a review of all the technique known at the time, was judged to be necessary to manage an increase to a higher voltage was that which is normally used for power transformers and which consists of dielectric-fluid-impregnated cellulose pressboard. Obvious disadvantages with the proposed solution are that, in addition to requiring a superconducting rotor, it requires a very thick insulation which increases the size of the machine. The coil ends must be insulated and cooled with oil or freons to control the large electric fields in the ends. The whole machine must be hermetically enclosed to prevent the liquid dielectric from absorbing moisture from the atmosphere.

When manufacturing rotating electric machines according to the state of the art, the winding is manufactured with conductors and insulation systems in several steps, whereby the winding must be preformed prior to mounting on the magnetic circuit. Impregnation for preparing the insulation system is performed after mounting of the winding on the magnetic circuit.

Power Transformer/Reactor

To be able to place a power transformer/reactor according to the invention in its proper context and hence be able to describe the new approach which the invention means as well as the advantages afforded by the invention in relation to the prior art, a relatively complete description of a power transformer as it is currently designed will first be given below as well as of the limitations and problems which exist when it comes to calculation, design, insulation, grounding, manufacture, use, testing, transport, etc., of these transformers.

From a purely general point of view, the primary task of a power transformer is to allow exchange of electric energy between two or more electrical systems of, normally, different voltages with the same frequency.

A conventional power transformer comprises a transformer core, in the following referred to as a core, often of laminated oriented sheet, usually of silicon iron. The core comprises a number of core limbs, connected by yokes which together form one or more core windows. Transformers with such a core are often referred to as core transformers. Around the core limbs there are a number of windings which are normally referred to as primary, secondary and control windings. As far as power transformers are concerned, these windings are practically always concentrically arranged and distributed along the length of the core limbs. The core transformer normally has circular coils as well as a tapering core limb section in order to fill up the coils as closely as possible.

Also other types of core designs are known, for example those which are included in so-called shell-type transformers. These are often designed with rectangular coils and a rectangular core limb section.

Conventional power transformers, in the lower part of the above-mentioned power range, are sometimes designed with air cooling to carry away the unavoidable inherent losses. For protection against contact, and possibly for reducing the external magnetic field of the transformer, it is then often provided with an outer casing provided with ventilating openings.

Most of the conventional power transformers, however, are oil-cooled. One of the reasons therefor is that the oil has the additional very important function as insulating medium. An oil-cooled and oil-insulated power transformer is therefore surrounded by an external tank on which, as will be clear from the description below, very high demands are placed. Normally, means for water-cooling of the coil are provided.

The following part of the description will for the most part refer to oil-filled power transformers.

The windings of the transformer are formed from one or several series-connected coils built up of a number of series-connected turns. In addition, the coils are provided with a special device to allow switching between the terminals of the coils. Such a device may be designed for changeover with the aid of screw joints or more often with the aid of a special changeover switch which is operable in the vicinity of the tank. In the event that changeover can take place for a transformer under voltage, the changeover switch is referred to as an on-load tap changer whereas otherwise it is referred to as a de-energized tap changer.

Regarding oil-cooled and oil-insulated power transformers in the upper power range, the breaking elements of the on-load tap changers are placed in special oil-filled containers with direct connection to the transformer tank. The breaking elements are operated purely mechanically via a motor-driven rotating shaft and are arranged so as to obtain a fast movement during the switching when the contact is open and a slower movement when the contact is to be closed. The on-load tap changers as such, however, are placed in the actual transformer tank. During the operation, arcing and sparking arise. This leads to degradation of the oil in the containers. To obtain less arcs and hence also less formation of soot and less wear on the contacts, the on-load tap changers are normally connected to the high-voltage side of the transformer. This is due to the fact that the currents which need to be broken and connected, respectively, are smaller on the high-voltage side than if the on-load tap changers were to be connected to the low-voltage side. Failure statistics of conventional oil-filled power transformers show that it is often the on-load tap changers which give rise to faults.

In the lower power range of oil-cooled and oil-insulated power transformers, both the on-load tap changers and their breaking elements are placed inside the tank. This means that the above-mentioned problems with degradation of the oil because of arcs during operation, etc., effect the whole oil system.

From the point of view of applied or induced voltage, it can broadly be said that a voltage which is stationary across a winding is distributed equally onto each turn of the winding, that is, the turn voltage is equal on all the turns.

From the point of view of electric potential, however, the situation is completely different. One end of a winding is normally connected to ground. This means, however, that the electric potential of each turn increases linearly from practically zero in the turn which is nearest the ground potential up to a potential in the turns which are at the other end of the winding which correspond to the applied voltage.

This potential distribution determines the composition of the insulation system since it is necessary to have sufficient insulation both between adjacent turns of the winding and between each turn and ground.

The turns in an individual coil are normally brought together into a geometrical coherent unit, physically delimited from the other coils. The distance between the coils is also determined by the dielectric stress which may be allowed to occur between the coils. This thus means that a certain given insulation distance is also required between the coils. According to the above, sufficient insulation distances are also required to the other electrically conducting objects which are within the electric field from the electric potential locally occurring in the coils.

It is thus clear from the above description that for the individual coils, the voltage difference internally between physically adjacent conductor elements is relatively low whereas the voltage difference externally in relation to other metal objects—the other coils being included—may be relatively high. The voltage difference is determined by the voltage induced by magnetic induction as well as by the capacitively distributed voltages which may arise from a connected external electrical system on the external connections of the transformer. The voltage types which may enter externally comprise, in addition to operating voltage, lightning overvoltages and switching overvoltages.

In the current leads of the coils, additional losses arise as a result of the magnetic leakage field around the conductor. To keep these losses as low as possible, especially for power transformers in the upper power range, the conductors are normally divided into a number of conductor elements, often referred to as strands, which are parallel-connected during operation. These strands must be transposed according to such a pattern that the induced voltage in each strand becomes as identical as possible and so that the difference in induced voltage between each pair of strands becomes as small as possible for internally circulating current components to be kept down at a reasonable level from the loss point of view.

When designing transformers according to the prior art, the general aim is to have as large a quantity of conductor material as possible within a given area limited by the so-called transformer window, generally described as having as high a fill factor as possible. The available space shall comprise, in addition to the conductor material, also the insulating material associated with the coils, partly internally between the coils and partly to other metallic components including the magnetic core.

The insulation system, partly within a coil/winding and partly between coils/windings and other metal parts, is normally designed as a solid cellulose- or varnish-based insulation nearest the individual conductor element, and outside of this as solid cellulose and liquid, possibly also gaseous, insulation. Windings with insulation and possible bracing parts in this way represent large volumes which will be subjected to high electric field strengths which arise in and around the active electromagnetic parts of the transformer. To be able to predetermine the dielectric stresses which arise and achieve a dimensioning with a minimum risk of breakdown, good knowledge of the properties of insulating materials is required. It is also important to achieve such a surrounding environment that it does not change or reduce the insulating properties.

The currently predominant insulation system for high-voltage power transformers comprises cellulose material as the solid insulation and transformer oil as the liquid insulation. The transformer oil is based on so-called mineral oil.

The transformer oil has a dual function since, in addition to the insulating function, it actively contributes to cooling of the core, the winding, etc., by removal of the loss heat of the transformer. Oil cooling requires an oil pump, an external cooling element, an expansion coupling, etc.

The electrical connection between the external connections of the transformer and the immediately connected coils/windings is referred to as a bushing aiming at a conductive connection through the tank which, in the case of oil-filled power transformers, surrounds the actual transformer. The bushing is often a separate component fixed to the tank and is designed to withstand the insulation requirements being made, both on the outside and the inside of the tank, while at the same time it should withstand the current loads occurring and the ensuing current forces. It should be pointed out that the same requirements for the insulation system as described above regarding the windings also apply to the necessary internal connections between the coils, between bushings and coils, different types of changeover switches and the bushings as such.

All the metallic components inside a power transformer are normally connected to a given ground potential with the exception of the current-carrying conductors. In this way, the risk of an unwanted, and difficult-to-control, potential increase as a result of capacitve voltage distribution between current leads at high potential and ground is avoided. Such an unwanted potential increase may give rise to partial discharges, so-called corona. Corona may be revealed during the normal acceptance tests, which partially occurs, compared with rated data, increased voltage and frequency. Corona may give rise to damage during operation.

The individual coils in a transformer must have such a mechanical dimensioning that they may withstand any stresses occurring as a consequence of currents arising and the resultant current forces during a short-circuit process. Normally, the coils are designed such that the forces arising are absorbed within each individual coil, which in turn may mean that the coil cannot be dimensioned optimally for its normal function during normal operation.

Within a narrow voltage and power range of oil-filled power transformers, the windings are designed as so-called sheet windings. This means that the individual conductors mentioned above are replaced by thin sheets. Sheet-wound power transformers are manufactured for voltages of up to 20–30 kV and powers of up to 20–30 MW.

The insulation system of power transformers within the upper power range requires, in addition to a relatively complicated design, also special manufacturing measures to utilize the properties of the insulation system in the best way. For a good insulation to be obtained, the insulation system shall have a low moisture content, the solid part of the insulation shall be well impregnated with the surrounding oil and the risk of remaining "gas" pockets in the solid part must be minimal. To ensure this, a special drying and impregnating process is carried out on a complete core with windings before it is lowered into a tank. After this drying and impregnating process, the transformer is lowered into the tank which is then sealed. Before filling of oil, the tank with the immersed transformer must be emptied of all air. This is done in connection with a special vacuum treatment. When this has been carried out, filling of oil takes place.

To be able to obtain the promised service life, etc., pumping out to almost absolute vacuum is required in connection with the vacuum treatment. This thus presupposes that the tank which surrounds the transformer is designed for full vacuum, which entails a considerable consumption of material and manufacturing time.

If electric discharges occur in an oil-filled power transformer, or if a local considerable increase of the temperature in any part of the transformer occurs, the oil is disintegrated and gaseous products are dissolved in the oil. The transformers are therefore normally provided with monitoring devices for detection of gas dissolved in the oil.

For weight reasons large power transformers are transported without oil. In-situ installation of the transformer at a customer requires, in turn, renewed vacuum treatment. In addition, this is a process which, furthermore, has to be repeated each time the tank is opened for some action or inspection.

It is obvious that these processes are very time-consuming and cost-demanding and constitute a considerable part of the total time for manufacture and repair while at the same time requiring access to extensive resources.

The insulating material in conventional power transformers constitutes a large part of the total volume of the transformer. For a power transformer in the upper power range, oil quantities in the order of magnitude of hundreds of cubic meters of transformer oil may occur. The oil which exhibits a certain similarity to diesel oil is thinly fluid and exhibits a relatively low flash point. It is thus obvious that oil together with the cellulose constitutes a non-negligible fire hazard in the case of unintentional heating, for example at an internal flashover and a resultant oil spillage.

It is also obvious that, especially in oil-filled power transformers, there is a very large transport problem. Such a power transformer in the upper power range may have a total weight of up to 1 000 tons. It is realized that the external design of the transformer must sometimes be adapted to the current transport profile, that is, for any passage of bridges, tunnels, etc.

Here follows a short summary of the prior art with respect to oil-filled power transformers and which may be described as limitation and problem areas therefor:

An oil-filled conventional power transformer comprises an outer tank which is to house a transformer comprising a transformer core with coils, oil for insulation and cooling, mechanical bracing devices of various kinds, etc. Very large mechanical demands are placed on the tank, since, without oil but with a transformer, it shall be capable of being vacuum-treated to practically full vacuum. The tank requires very extensive manufacturing and testing processes and the large external dimensions of the tank also normally entail considerable transport problems;

normally comprises a so-called pressure-oil cooling. This cooling method requires the provision of an oil pump, an external cooling element, an expansion vessel and an expansion coupling, etc.;

comprises an electrical connection between the external connections of the transformer and the immediately connected coils/windings in the form of a bushing fixed to the tank. The bushing is designed to withstand any insulation requirements made, both regarding the outside and the inside of the tank;

comprises coils/windings whose conductors are divided into a number of conductor elements, strands, which have to be transposed in such a way that the voltage induced in each strand becomes as identical as possible and such that the difference in induced voltage between each pair of strands becomes as small as possible;

comprises an insulation system, partly within a coil/winding and partly between coils/windings and other metal parts which is designed as a solid cellulose- or varnish-based insulation nearest the individual conductor element and, outside of this, solid cellulose and a liquid, possibly also gaseous, insulation. In addition, it is extremely important that the insulation system exhibits a very low moisture content;

comprises as an integrated part an on-load tap changer, surrounded by oil and normally connected to the high-voltage winding of the transformer for voltage control;

comprises oil which may entail a non-negligible fire hazard in connection with internal partial discharges, so-called corona, sparking in on-load tap changers and other fault conditions;

comprises normally a monitoring device for monitoring gas dissolved in the oil, which occurs in case of electrical discharges therein or in case of local increases of the temperature;

comprises oil which, in the event of damage or accident, may result in oil spillage leading to extensive environmental damage.

SUMMARY OF THE INVENTION

The object of the present invention is primarily to provide an electromagnetic device, in which at least one or some of the disadvantages discussed hereinabove and impairing the prior art have been eliminated. Besides, the invention secondarily aims at devising a method for electric field control in an electromagnetic device for electric power purposes and a method for producing a magnetic circuit for a rotating electric machine.

The primary object is achieved by means of a device of the kind defined in the following claims, and then first of all in the characterizing part of any of claims 1–5.

In a wide sense, it is established that the design according to the invention reduces the occurring losses such that the device, accordingly, may operate with a higher efficiency as a consequence of the fact that the invention makes it possible to substantially enclose the electric field occurring due to said electric conductor in the insulation system. The reduction of losses results, in turn, in a lower temperature in the device, which reduces the need for cooling and allows possibly occurring cooling devices to be designed in a more simple way than without the invention.

The conductor/insulation system according to the invention may be realised as a flexible cable, which means substantial advantages with respect to production and mounting as compared to the prefabricated, rigid windings which have been conventional up to now. The insulation system used according to the invention results in abscence of gaseous and liquid insulation materials.

As to the aspect of the invention as a rotating electric machine it is thus possible to operate the machine with such a high voltage that the Δ/Y-connected step-up transformer mentioned above can be omitted. That is, the machine can be operated with a considerably higher voltage than machines according to the state of the art to be able to perform direct connection to power networks. This means considerably lower investment costs for systems with a rotating electric machine and the total efficiency of the system can be increased. The invention eliminates the need for particular field control measures at certain areas of the winding, such field control measures having been necessary according to the prior art. A further advantage is that the invention makes it more simple to obtain under- and overmagnetization for the purpose of reducing reactive effects as a result of voltage and current being out of phase with each other.

As to the aspect of the invention as a power transformer/reactor, the invention, first of all, eliminates the need for oil filling of the power transformers and the problems and disadvantages associated thereto.

The design of the winding so that it comprises, along at least a part of its length, an insulation formed by a solid insulating material, inwardly of this insulation an inner layer and outwardly of the insulation an outer layer with these layers made of a semi conducting material makes it possible to enclose the electric field in the entire device within the winding. The term "solid insulating material" used herein means that the winding is to lack liquid or gaseous insulation, for instance in the form of oil. Instead the insulation is intended to be formed by a polymeric material. Also the inner and outer layers are formed by a polymeric material, though a semiconducting such.

The inner layer and the solid insulation are rigidly connected to each other over substantially the entire interface. Also the outer layer and the solid insulation are rigidly connected to each other over substantially the entire interface therebetween. The inner layer operates equalizing with respect to potential and, accordingly, equalizing with respect to the electrical field outwardly of the inner layer as a consequence of the semiconducting properties thereof. The outer layer is also intended to be made of a semiconducting material and it has at least an electrical conductivity being higher than that of the insulation so as to cause the outer layer, by connection to earth or otherwise a relatively low potential, to function equalizing with regard to potential and to substantially enclose the electrical field resulting due to said electrical conductor inwardly of the outer layer. On the other hand, the outer layer should have a resistivity which is sufficient to minimize electrical losses in said outer layer.

The rigid interconnection between the insulating material and the inner and outer semiconducting layers should be uniform over substantially the entire interface such that no cavities, pores or similar occur. With the high voltage levels contemplated according to the invention, the electrical and thermal loads which may arise will impose extreme demands on the insulation material. It is known that so-called partial discharges, PD, generally constitute a serious problem for the insulating material in high-voltage installations. If cavities, pores or the like arise at an insulating layer, internal corona discharges may arise at high electric voltages, whereby the insulating material is gradually degraded and the result could be electric breakdown through the insulation. This may lead to serious breakdown of the electromagnetic device. Thus, the insulation should be homogenous.

The inner layer inwardly of the insulation should have an electrical conductivity which is lower than that of the electrical conductor but sufficient for the inner layer to function equalizing with regard to potential and, accordingly, equalizing with respect to the electrical field externally of the inner layer. This in combination with the rigid interconnection of the inner layer and the electrical insulation over substantially the entire interface, i.e. the abscence of cavities etc, means a substantially uniform electrical field externally of the inner layer and a minimum of risk for PD.

It is preferred that the inner layer and the solid electrical insulation are formed by materials having substantially equal thermal coefficients of expansion. The same is preferred as far as the outer layer and the solid insulation is concerned. This means that the inner and outer layers and the solid electrical insulation will form an insulation system which on temperature changes expands and contracts uniformly as a monolithic part without those temperature changes giving rise to any destruction or disintegration in the interfaces. Thus, intimacy in the contact surface between the inner and outer layers and the solid insulation is ensured and conditions are created to maintain this intimacy during prolonged operation periods.

The electrical load on the insulation system decreases as a consequence of the fact that the inner and the outer layers of semiconducting material around the insulation will tend to form substantially equipotential surfaces and in this way the electrical field in the insulation properly will be distributed relatively uniformly over the thickness of the insulation.

It is known, per se, in connection with transmission cables for high-voltage and for transmission of electric energy, to design conductors with an insulation of a solid insulation material with inner and outer layers of semiconducting material. In transmission of electric energy, it has since long been realised that the insulation should be free from defects. However, in high voltage cables for transmission, the electric potential does not change along the length of the cable but the potential is basically at the same level. However, also in high voltage cables for transmission purposes, instantaneous potential differences may occur due to transient occurrencies, such as lightning. According to the present invention a flexible cable according to the enclosed claims is used as a winding in the electromagnetic device.

An additional improvement may be achieved by constructing the electric conductor in the winding from smaller, so-called strands, at least some of which are insulated from each other. By making these strands to have a relatively small cross section, preferably approximately circular, the magnetic field across the strands will exhibit a constant geometry in relation to the field and the occurrence of eddy currents are minimized.

According to the invention, the winding/windings is/are thus preferably made in the form of a cable comprising at least one conductor and the previously described insulation system, the inner layer of which extends about the strands of the conductor. Outside of this inner semiconducting layer is the main insulation of the cable in the form of a solid insulation material.

The outer semiconducting layer shall according to the invention exhibit such electrical properties that a potential equalization along the conductor is ensured. The outer layer may, however, not exhibit such conductivity properties that an induced current will flow along the surface, which could cause losses which in turn may create an unwanted thermal load. For the inner and outer layers the resistance statements (at 20° C.) defined in the enclosed claims 8 and 9 are valid. With respect to the inner semiconducting layer, it must have a sufficient electrical conductivity to ensure potential equalization for the electrical field but at the same time this layer must have such a resistivity that the enclosing of the electric field is ensured. It is important that the inner layer equalizes irregularities in the surface of the conductor and forms an equipotential surface with a high surface finish at the interface with the solid insulation. The inner layer may be formed with a varying thickness but to ensure an even surface with respect to the conductor and the solid insulation, the thickness is suitably between 0.5 and 1 mm.

Such a flexible winding cable which is used according to the invention in the electromagnetic device thereof is an improvement of a XLPE (cross-linked poly ethylene) cable or a cable with EP (ethylene-propylene) rubber insulation or other rubber, for example silicone. The improvement comprises, inter alia, a new design both as regards the strands of the conductors and in that the cable, at least in some embodiments, has no outer casing for mechanical protection of the cable. However, it is possible according to the invention to arrange a conducting metal shield and an outer mantel externally of the outer semiconducting layer. The metal shield will then have the character of an outer mechanical and electrical protection, for instance to lightning. It is preferred that the inner semiconducting layer will lie on the potential of the electrical conductor. For this purpose at least one of the strands of the electrical conductor will be uninsulated and arranged so that a good electrical contact is obtained to the inner semiconducting layer. Alternatively, different strands may be alternatingly brought into electrical contact with the inner semiconducting layer.

Manufacturing transformer or reactor windings of a cable according to the above entails drastic differences as regards the electric field distribution between conventional power transformers/reactors and a power transformer/reactor according to the invention. The decisive advantage with a cable-formed winding according to the invention is that the electric field is enclosed in the winding and that there is thus no electric field outside the outer semiconducting layer. The electric field achieved by the current-carrying conductor occurs only in the solid main insulation. Both from the design point of view and the manufacturing point of view this means considerable advantages:

the windings of the transformer may be formed without having to consider any electric field distribution and the transposition of strands, mentioned under the background art, is omitted;

the core design of the transformer may be formed without having to consider any electric field distribution;

no oil is needed for electrical insulation of the winding, that is, the medium surrounding the winding may be air;

no special connections are required for electrical connection between the outer connections of the transformer and the immediately connected coils/windings, since the electrical connection, contrary to conventional plants, is integrated with the winding;

the manufacturing and testing technology which is needed for a power transformer according to the invention is considerably simpler than for a conventional power transformer/reactor since the impregnation, drying and vacuum treatments described under the description of the background art are not needed. This provides considerably shorter production times;

by using the technique according to the invention for insulation, considerable possibilities are provided for developing the magnetic part of the transformer, which was given according to the prior art.

In application of the invention as a rotating electric machine a substantially reduced thermal load on the stator is obtained. Temporary overloads of the machine will, thus, be less critical and it will be possible to drive the machine at overload for a longer period of time without running the risk of damage arising. This means considerable advantages for owners of power generating plants who are forced today, in case of operational disturbances, to rapidly switch to other equipment in order to ensure the delivery requirements laid down by law.

With a rotating electric machine according to the invention, the maintenance costs can be significantly reduced because transformers and circuit breakers do not have to be included in the system for connecting the machine to the power network.

Above it has already been described that the outer semiconducting layer of the winding cable is intended to be connected to ground potential. The purpose is that the layer should be kept substantially on ground potential along the entire length of the winding cable. It is possible to divide the outer semiconducting layer by cutting the same into a number of parts distributed along the length of the winding cable, each individual layer part being connectable directly to ground potential. In this way a better uniformity along the length of the winding cable is achieved.

Above it has been mentioned that the solid insulation and the inner and outer layers may be achieved by, for instance, extrusion. Other techniques are, however, also well possible, for instance formation of these inner and outer layers and the insulation respectively by means of spraying of the material in question onto the conductor/winding.

It is preferred that the winding cable is designed with a circular cross section. However, also other cross sections may be used in cases where it is desired to achieve a better packing density.

To build up a voltage in the rotating electric machine, the cable is disposed in several consecutive turns in slots in the magnetic core. The winding can be designed as a multilayer concentric cable winding to reduce the number of coil-end crossings. The cable may be made with tapered insulation to utilize the magnetic core in a better way, in which case the shape of the slots may be adapted to the tapered insulation of the winding.

A significant advantage with a rotating electric machine according to the invention is that the E field is near zero in the coil-end region outside the outer semiconductor and that with the outer casing at ground potential, the electric field need not be controlled. This means that no field concentrations can be obtained, neither within sheets, in coil-end regions or in the transition therebetween.

The present invention is also related to a method for electric field control in an electromagnetic device for electric power purposes.

The invention also relates to a method for manufacturing a magnetic circuit, a flexible cable, which is threaded into openings in slots in a magnetic core of the rotating electrical machine being used as a winding. Since the cable is flexible, it can be bent and this permits a cable length to be disposed in several turns in a coil. The coil ends will then consist of bending zones in the cables. The cable may also be joined in such a way that its properties remain constant over the cable length. This method entails considerable simplifications compared with the state of the art. The so-called Roebel bars are not flexible but must be preformed into the desired shape. Impregnation of the coils is also an exceedingly complicated and expensive technique when manufacturing rotating electric machines today.

To sum up, thus, a rotating electric machine according to the invention means a considerable number of important advantages in relation to corresponding prior art machines. First of all, it can be connected directly to a power network at all types of high voltage. By high voltage are meant here voltages exceeding 10 kV and up to the voltage levels which occur for power networks. Another important advantage is that a chosen potential, for example ground potential, has been consistently conducted along the whole winding, which means that the coil-end region can be made compact and that bracing means at the coil-end region can be applied at practically ground potential or any other chosen potential. Still another important advantage is that oil-based insulation and cooling systems disappear also in rotating electric machines as already has been pointed out above with regard to power transformers/reactors. This means that no sealing problems may arise and that the dielectric ring previously mentioned is not needed. One advantage is also that all forced cooling can be made at ground potential.

BRIEF DESCRIPTION OF THE DRAWINGS

With reference to the enclosed drawings, a more specific description of embodiment examples of the invention will follow hereinafter.

In the drawings.

DESCRIPTION OF PREFERRED EMBODIMENTS

Figure 1:
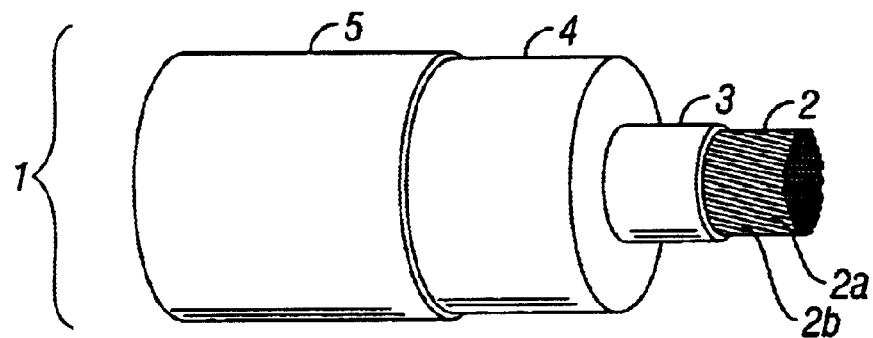
FIG. 1 is a partly cut view showing the parts included in the current modified standard cable.
Figure 2:
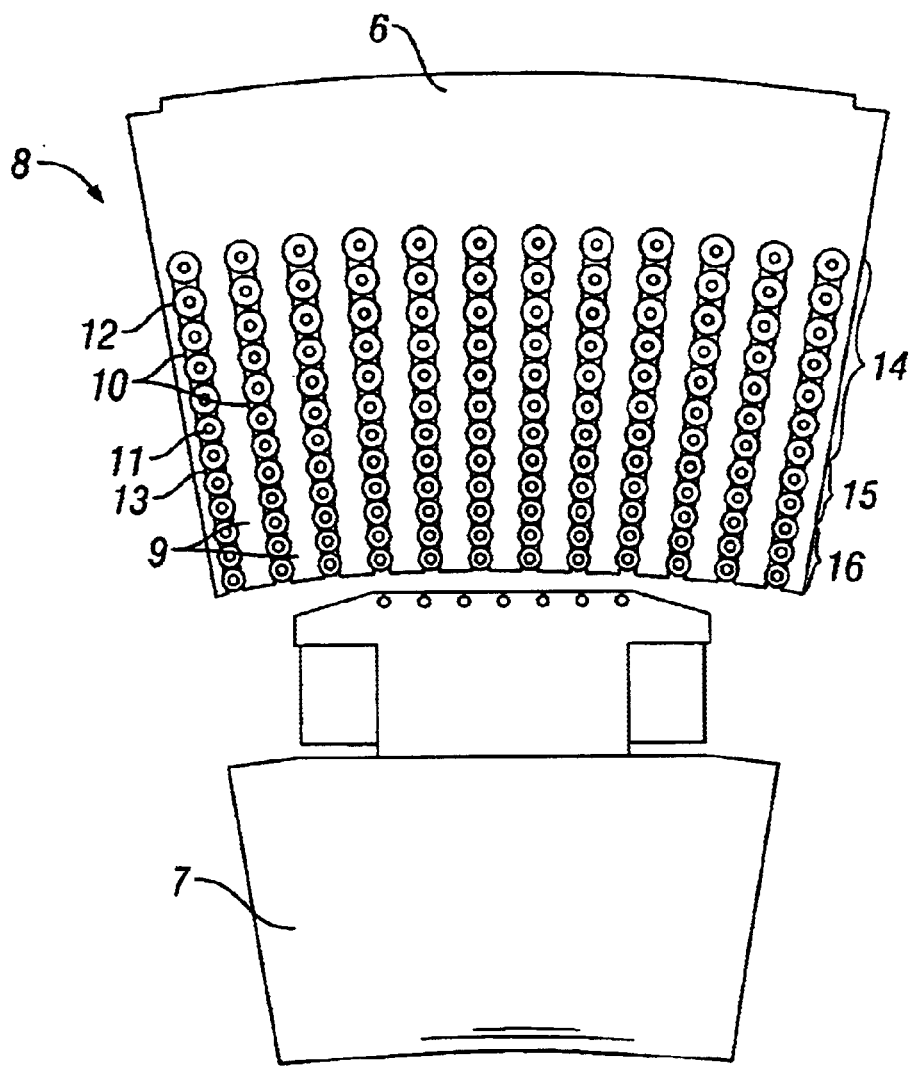
FIG. 2 is an axial end view of a sector/pole pitch of a magnetic circuit according to the invention.

Rotating Electric Machine According to FIGS. 1 and 2

An important condition for being able to manufacture a magnetic circuit in accordance with the description of the invention, is to use for the winding a conductor cable with a solid electrical insulation with an inner semiconducting layer or casing between the insulation and one or more electrical conductors located inwardly therof and with an outer semiconducting layer or casing located outwardly of the insulation. Such cables are available as standard cables for other power engineering fields of use, namely power transmission. To be able to describe an embodiment, initially a short description of a standard cable will be made. The inner current-carrying conductor comprises a number of non-insulated strands. Around the strands there is a semiconducting inner layer. Around this semiconducting inner layer, there is an insulating layer of solid insulation. The solid insulation is formed by a polymeric material with low electrical losses and a high breakthrough strength. As concrete examples polyethylene (PE) and then particularly cross-linked polyethylene (XLPE) and ethylene-propylene (EP) may be mentioned. Around the outer semiconducting layer a metal shield and an outer insulation casing may be provided. The semiconducting layers consist of a polymeric material, for example ethylene-copolymer, with an electrically conducting constituent, e.g. conductive soot or carbon black. Such a cable will be referred to hereunder as a power cable.

A preferred embodiment of a cable intended for a winding in a rotating electrical machine appears from FIG. 1. The cable 1 is described in the figure as comprising a current-carrying conductor 2 which comprises transposed both non-insulated strands 2A and insulated strands 2B. Electromechanically transposed, extruded insulated strands are also possible. These strands may be stranded/transposed in a plurality of layers. Around the conductor there is an inner semiconducting layer 3 which, in turn, is surrounded by a homogenous layer of a solid insulation material. The insulation 4 is entirely without insulation material of liquid or gaseous type. This layer 4 is surrounded by an outer semiconducting layer 5. The cable used as a winding in the preferred embodiment may be provided with metal shield and external sheath but must not be so. To avoid induced currents and losses associated therewith in the outer semiconducting layer 5, this is cut off, preferably in the coil end, that is, in the transitions from the sheet stack to the end windings. The cut-off is carried such that the outer semiconducting layer 5 will be divided into several parts distributed along the cable and being electrically entirely or partly separated from each other. Each cut-off part is then connected to ground, whereby the outer semiconducting layer 5 will be maintained at, or near, ground potential in the whole cable length. This means that, around the solid insulated winding at the coil ends, the contactable surfaces, and the surfaces which are dirty after some time of use, only have negligible potentials to ground, and they also cause negligible electric fields.

To optimize a rotating electric machine, the design of the magnetic circuit as regards the slots and the teeth, respectively, are of decisive importance. As mentioned above, the slots should connect as closely as possible to the casing of the coil sides. It is also desirable that the teeth at each radial level are as wide as possible. This is important to minimize the losses, the magnetization requirement, etc., of the machine.

With access to a conductor for the winding such as for example, the cable described above, there are great possibilities of being able to optimize the magnetic core from several points of view. In the following, a magnetic circuit in the stator of the rotating electric machine is referred to. FIG. 2 shows an embodiment of an axial end view of a sector/pole pitch 6 of a machine according to the invention. The rotor with the rotor pole is designated 7. In conventional manner, the stator is composed of a laminated core of electric sheets successively composed of sector-shaped sheets. From a back portion 8 of the core, located at the radially outermost end, a number of teeth 9 extend radially inwards towards the rotor. Between the teeth there are a corresponding number of slots 10. The use of cables 11 according to the above among other things permits the depth of the slots for high-voltage machines to be made larger than what is possible according to the state of the art. The slots have a cross section tapering towards the rotor since the need of cable insulation becomes lower for each winding layer towards the air gap. As is clear from the figure, the slot substantially consists of a circular cross section 12 around each layer of the winding with narrower waist portions 13 between the layers. With some justification, such a slot cross section may be referred to as a "cycle chain slot". In the embodiment shown in FIG. 2, cables with three different dimensions of the cable insulation are used, arranged in three correspondingly dimensioned sections 14, 15 and 16, that is, in practice a modified cycle chain slot will be obtained. The figure also shows that the stator tooth can be shaped with a practically constant radial width along the depth of the whole slot.

In an alternative embodiment, the cable which is used as a winding may be a conventional power cable as the one described above. The grounding of the outer semiconducting shield then takes place by stripping the metal shield and the sheath of the cable at suitable locations.

The scope of the invention accommodates a large number of alternative embodiments, depending on the available cable dimensions as far as insulation and the outer semiconductor layer etc. are concerned. Also embodiments with so-called cycle chain slots can be modified in excess of what has been described here.

As mentioned above, the magnetic circuit may be located in the stator and/or the rotor of the rotating electric machine. However, the design of the magnetic circuit will largely correspond to the above description independently of whether the magnetic circuit is located in the stator and/or the rotor.

As winding, a winding is preferably used which may be described as a multilayer, concentric cable winding. Such a winding means that the number of crossings at the coil ends has been minimized by placing all the coils within the same group radially outside one another. This also permits a simpler method for the manufacture and the threading of the stator winding in the different slots. Since the cable used according to the invention is relatively easily flexible, the winding may be obtained by a comparatively simple threading operation, in which the flexible cable is threaded into the openings 12 present in the slots 10.

Figure 3:
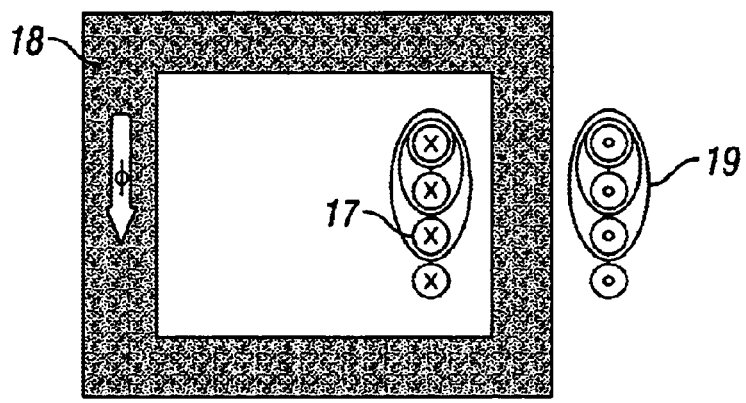
FIG. 3 is a view showing the electric field distribution around a winding of a conventional power transformer/reactor.
Figure 4:
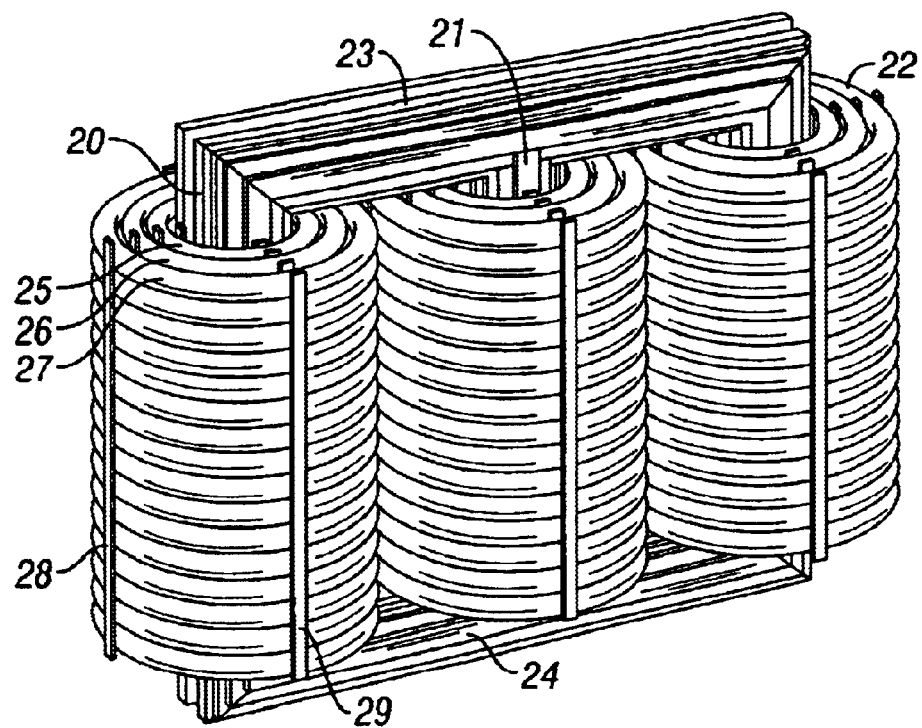
FIG. 4 is a perspective view showing an embodiment of a power transformer according to the invention.

Power Transformer/reactor (FIGS. 3 and 4)

FIG. 3 shows a simplified and fundamental view of the electric field distribution around a winding of a conventional power transformer/reactor, where 17 is a winding and 18 a core and 19 illustrates equipotential lines, that is, lines where the electric field has the same magnitude. The lower part of the winding is assumed to be at ground potential.

The potential distribution determines the composition of the insulation system since it is necessary to have sufficient insulation both between adjacent turns of the winding and between each turn and ground. The figure thus shows that the upper part of the winding is subjected to the highest insulation loads. The design and location of a winding relative to the core are in this way determined substantially by the electric field distribution in the core window.

The cable which can be used in the windings contained in the dry power transformers/reactors according to the invention have been described with assistance of FIG. 1. The cable may, as stated before, be provided with other, additional outer layers for special purposes, for instance to prevent excessive electrical strains on other areas of the transformer/reactor. From the point of view of geometrical dimension, the cables in question will have a conductor area which is between 2 and 3000 mm$^2$ and an outer cable diameter which is between 20 and 250 mm.

The windings of a power transformer/reactor manufactured from the cable described under the summary of the invention may be used both for single-phase, three-phase and polyphase transformers/reactors independently of how the core is shaped. One embodiment is shown in FIG. 4 which shows a three-phase laminated core transformer. The core comprises, in conventional manner, three core limbs 20, 21 and 22 and the retaining yokes 23 and 24. In the embodiment shown, both the core limbs and the yokes have a tapering cross section.

Concentrically around the core limbs, the windings formed with the cable are disposed. As is clear, the embodiment shown in FIG. 4 has three concentric winding turns 25, 26 and 27. The innermost winding turn 25 may represent the primary winding and the other two winding turns 26 and 27 may represent secondary windings. In order not to overload the figure with too many details, the connections of the windings are not shown. Otherwise the figure shows that, in the embodiment shown, spacing bars 28 and 29 with several different functions are disposed at certain points around the windings. The spacing bars may be formed of insulating material intended to provide a certain space between the concentric winding turns for cooling, bracing, etc. They may also be formed of electrically conducting material in order to form part of the grounding system of the windings.

Alternative Cable Designs

Figure 5:
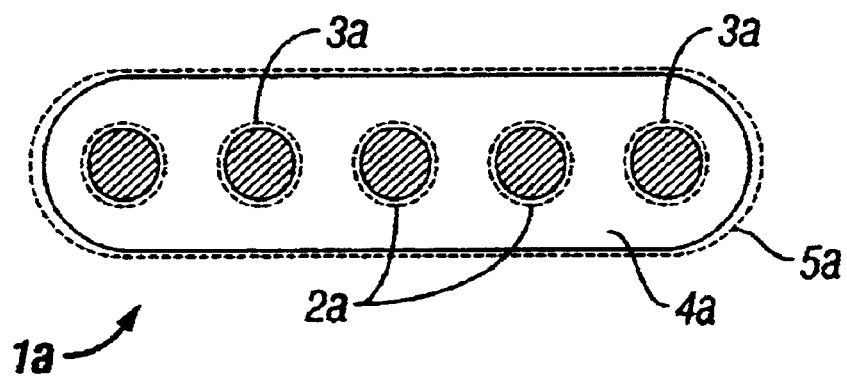
FIG. 5 is a cross section illustrating a cable structure modified relative to FIG. 1 and having several electrical conductors.

In the cable variant illustrated in FIG. 5, the same reference characters as before are used, only with the addition of the letter a characteristic for the embodiment. In this embodiment the cable comprises several electric conductors 2a, which are mutually separated by means of insulation 4a. Expressed in other words, the insulation 4a serves both for insulation between individual adjacent electrical conductors 2a and between the same and the surrounding. The different electrical conductors 2a may be disposed in different manners, which may provide for varying cross-sectional shapes of the cable in its entirety. In the embodiment according to FIG. 5 it is illustrated that the conductors 2a are disposed on a straight line, which involves a relatively flat cross-sectional shape of the cable. From this it can be concluded that the cross-sectional shape of the cable may vary within wide limits.

In FIG. 5 there is supposed to exist, between adjacent electrical conductors, a voltage smaller than phase voltage. More specifically, the electrical conductors 2a in FIG. 5 are supposed to be formed by different revolutions in the winding, which means that the voltage between these adjacent conductors is comparatively low.

As before, there is a semiconducting outer layer 5a exteriorly of the insulation 4a obtained by a solid electrical insulation material. An inner layer 3a of a semiconducting material is arranged about each of said electrical conductors 2a, i.e. each of these conductors has a surrounding inner semiconducting layer 3a of its own. This layer 3a will, accordingly, serve potential equalizing as far as the individual electrical conductor is concerned.

Figure 6:
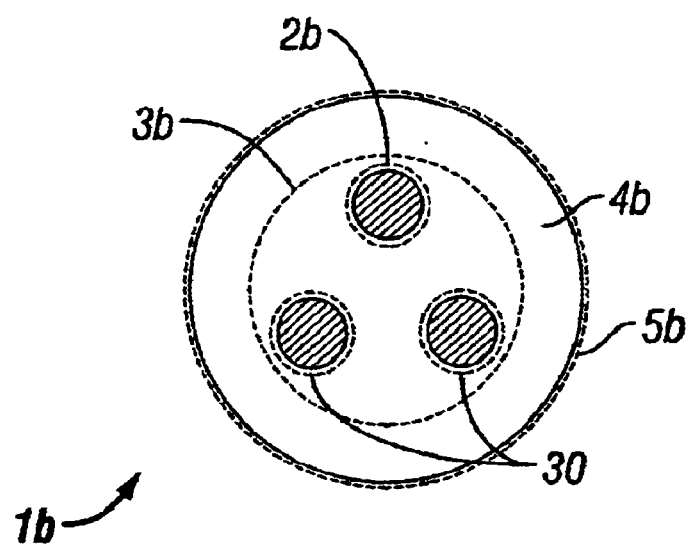
FIG. 6 is a cross section of a further cable structure comprising several electric conductors but in another arrangement than that in FIG. 5.

The variant in FIG. 6 uses the same reference characters as before only with addition of the letter b specific for the embodiment. Also in this case there are several, more specifically three, electrical conductors 2b. Phase voltage is supposed to be present between these conductors, i.e. a substantially higher voltage than the one occurring between conductors 2a in the embodiment according to FIG. 5. In FIG. 6 there is an inner semiconducting layer 3b inwardly of which the electrical conductors 2b are arranged. Each of the electrical conductors 2b is, however, enclosed by a further layer 30 of its own, with properties corresponding to the properties discussed hereinabove with regard to the inner layer 3b. Between each further layer 30 and the layer 3b arranged thereabout, there is insulation material. Accordingly, the layer 3b will occur as a potential equalizing layer outside the further layers 30 of semiconducting material belonging to the electrical conductors, said further layers 30 being connected to the respective electrical conductor 2b to be placed on the same potential as the conductor.

Possible Modifications

It is evident that the invention is not only limited to the embodiments discussed above. Thus, the man skilled within this art will realise that a number of detailed modifications are possible when the basic concept of the invention has been presented without deviating from this concept as it is defined in the enclosed claims. As an example, it is pointed out that the invention is not only restricted to the specific material selections exemplified above. Functionally equal materials may, accordingly, be used instead. As far as the manufacturing of the insulation system according to the invention is concerned, it is pointed out that also other techniques than extrusion and spraying are possible as long as intimacy between the various layers is achieved. Furthermore, it is pointed out that additional equipotential layers could be arranged. For example, one or more equipotential layers of semiconducting material could be placed in the insulation between those layers designated as "inner" and "outer" hereinabove.

What is claimed is:

1. A high voltage electromagnetic device comprising a winding, wherein said winding comprises a flexible cable including at least one current-carrying conductor including a plurality of insulated conductive elements and at least one uninsulated conductive element and a magnetically permeable, electric field confining insulating cover surrounding the conductor in contact with the at least one uninsulated element, said cable forming at least one uninterrupted turn in the corresponding winding of said device.

2. The device of claim 1, wherein the cover comprises an insulating layer surrounding the conductor and an outer layer surrounding the insulating layer, said outer layer having a conductivity for establishing an equipotential surface around the conductor.

3. The device of claim 1, wherein the cover comprises a plurality of layers joined together to form a monolithic structure including an insulating layer and wherein said joined together plurality of layers are substantially void fre.

4. The device of claim 1, wherein the cover comprises a plurality of layers joined together to form a monolithic structure wherein the joined together layers have substantially the same temperature coefficient of expansion.

5. The device of claim 1, wherein the cover comprises a plurality of layers joined together to form a monolithic structure such that the device is operable at 100% overload for two hours.

6. The device of claim 1, wherein the cover is operable to render the cable free of sensible end winding loss.

7. The device of claim 1, wherein the cover is operable to render the cable free of partial discharge and field control.

8. An electromagnetic device comprising a magnetic field generating electric circuit including at least one electric conductor for producing when energized an electric field and having an insulation system comprising a magnetically permeable electric field confining insulating covering surrounding the conductor including a solid insulation material and at least one layer having an electric conductivity higher than the insulation to equalize potential and to enclose the electric field, inwardly of the at least one layer, wherein the at least one layer comprises an inner layer surrounding the conductor, and the inner layer has an electrical conductivity lower than the conductivity of the conductor for equalizing the electrical field exteriorly of the inner layer, and wherein said conductor comprises a plurality of insulated conductive elements and at least one uninsulated conductive element in electrical contact with the inner layer.

9. The device according to claim 8, wherein said at least one conductor forms at least one induction turn.

10. The device according to claim 8, wherein at least one of the inner layer and the outer layer has a resistivity in the range of at least one of about $10^{-6}$ cm and bout 10 k cm, about $10^{-3}$ and about 1000 cm, and about 1 and about 500 cm.

11. The device according to claim 8, wherein at least one of the inner layer and the outer layer has a resistance in a range of about $50\mu$ and about 5.

12. The device according to claim 8, wherein the solid insulation at least one of the inner layer and the outer layer are formed of polymeric materials.

13. The device according to claim 8, wherein the inner layer and at least one of the outer layer and the solid insulation are rigidly connected to each other an along interface therebetween.

14. The device according to claim 8, wherein the inner layer and at least one of the outer layer and the solid insulation are formed by materials having substantially equal thermal coefficients of expansion.

15. The device according to claim 8, wherein the solid insulation comprises an extruded layer.

16. The device according to claim 15, wherein at least one of the inner layer and the outer layer comprises an extruded layer simultaneously formed with the extruded layer of the solid insulation.

17. The device according to claim 8, wherein the conductor and the insulation system comprises a winding in the form of a flexible cable.

18. The device according to claim 8, wherein the conductor has an area in a range of about 2 and about 3000 mm² and the cable has an external diameter in a range of about 20 and about 250 mm.

19. The device according to claim 8, wherein at least one of the inner layer and the outer layer comprises a polymeric material including an electrically conducting component.

20. The device according to claim 8, wherein the insulation system is operable at high voltage in excess of at least one 10 kV, 36 kV and 72.5 kV.

21. The device according to claim 8, wherein the outer layer is divided into a plurality of parts, separately connected to at least one of ground or otherwise a relatively low potential.

22. The device according to claim 8, comprising at least two galvanically separated concentrically wound windings.

23. The device according to claim 8, said device comprising a rotating electric machine.

24. The machine according to claim 23, further comprising at least one of a stator and rotor forming a magnetic field generating electrical circuit for said machine.

25. The machine according to claim 23, wherein the magnetic field generating circuit comprises at least one magnetic core having slots for receiving the winding.

26. The machine according to claim 25 wherein the machine has a coil-end-region and the electrical field outside the insulation system is about zero in the slots and in the coil-end-region when an outer layer of the insulation system is grounded.

27. The machine according to claim 23, wherein the slots have the shape of cylindrical openings separated by a narrower waist portions therebetween.

28. The machine according to claim 27, wherein the slots have a cross section which decreases inwardly of the magnetic core.

29. The machine according to claim 28, wherein the slots have a cross section which decreases.

30. The machine according to claim 23, comprising at least one of a generator, a motor, a synchronous compensator, a transformer and a reactor.

31. The method according to claim 23, wherein the magnetic field generating circuit is arranged in at least one of a stator and a rotor of a rotating electric machine including a magnetic core having slots for the winding, said slots being formed with openings, the winding comprising a flexible cable threaded into the openings.

32. An electromagnetic device comprising a magnetic field generating electric circuit including at least one electric conductor for producing an electric field when energized and an insulation system surrounding the conductor, wherein the insulation system comprises an electric insulation formed by a solid insulating material and inwardly thereof an inner layer, said at least one electric conductor being located inwardly of the inner layer, the inner layer having an electric conductivity lower than the electric conductor for equalizing the electric field exteriorly of the inner layer, wherein said conductor comprises a plurality of insulated conductive elements and at least one uninsulated conductive element in electrical contact with the inner layer.

33. The device according to claim 32, wherein the insulation system further comprises an outer layer having an electric conductivity which is higher than the insulation to equalize and enclose the electric field inwardly of the outer layer.

34. The device according to claim 32, wherein the insulation system includes an outermost layer having an electric conductivity higher than the insulation.

35. The device according to claim 34, wherein the inner and outermost layers are formed of semiconducting materials.

36. An electromagnetic device comprising at least one electric conductor having an insulation system comprising an insulated covering surrounding the conductor, including an inner layer of semiconducting material, an outer layer of semiconducting material and a solid insulation material between the inner and outer layers, the inner and outer layers and the solid insulation having substantially the same thermal properties, wherein said at least one electric conductor comprises a plurality of insulated conductive elements and at least one uninsulated conductive element in electrical contact with the inner layer.

37. A method for electric field control in an electromagnetic device comprising a magnetic field generating circuit having at least one winding for producing, when energized, an electric field, including least one electric conductor and an electric insulation externally thereof, wherein the insulation is formed by a solid insulation material and an outer layer externally of the insulation material, said outer layer being connected to a relatively low potential and having an electrical conductivity higher than the conductivity of the insulation and lower than the conductivity of the electrical conductor for equalizing potential and confining the electrical field within the outer layer, wherein said at least one electric conductor comprises a plurality of insulated conductive elements and at least one uninsulated conductive element in electrical contact with the inner layer.

* * * * *